US010158549B2

(12) United States Patent
Paul

(10) Patent No.: US 10,158,549 B2
(45) Date of Patent: Dec. 18, 2018

(54) REAL-TIME MONITORING OF COMPUTER SYSTEM PROCESSOR AND TRANSACTION PERFORMANCE DURING AN ONGOING PERFORMANCE TEST

(71) Applicant: FMR LLC, Boston, MA (US)

(72) Inventor: Kanwar Gaurav Paul, Cary, NC (US)

(73) Assignee: FMR LLC, Boston, MA (US)

( * ) Notice: Subject to any disclaimer, the term of this patent is extended or adjusted under 35 U.S.C. 154(b) by 586 days.

(21) Appl. No.: 14/858,731

(22) Filed: Sep. 18, 2015

(65) Prior Publication Data

US 2017/0085458 A1 Mar. 23, 2017

(51) Int. Cl.
*H04L 12/24* (2006.01)
*H04L 12/26* (2006.01)

(52) U.S. Cl.
CPC ............ *H04L 43/12* (2013.01); *H04L 41/046* (2013.01); *H04L 43/04* (2013.01); *H04L 43/045* (2013.01); *H04L 43/0817* (2013.01)

(58) Field of Classification Search
CPC ....... H04L 43/12; H04L 41/046; H04L 43/04; H04L 43/045; H04L 43/0817
See application file for complete search history.

(56) References Cited

U.S. PATENT DOCUMENTS

| 7,761,556 | B2 | 7/2010 | Mills | |
|---|---|---|---|---|
| 2002/0116441 | A1* | 8/2002 | Ding | G06F 9/5011 718/105 |
| 2005/0278703 | A1 | 12/2005 | Lo et al. | |
| 2006/0179136 | A1* | 8/2006 | Loboz | G06F 11/3409 709/224 |
| 2007/0180085 | A1* | 8/2007 | Barnett | G06Q 10/04 709/223 |
| 2007/0180093 | A1 | 8/2007 | Roth et al. | |
| 2008/0263195 | A1 | 10/2008 | Kroll et al. | |
| 2008/0270526 | A1* | 10/2008 | Barnett | H04L 67/10 709/203 |
| 2010/0138811 | A1 | 6/2010 | Jayaraman et al. | |
| 2014/0289710 | A1 | 9/2014 | Goto et al. | |
| 2015/0234728 | A1* | 8/2015 | Coleman | G06F 11/324 714/57 |

* cited by examiner

*Primary Examiner* — Philip J Chea
*Assistant Examiner* — Robert B McAdams
(74) *Attorney, Agent, or Firm* — Proskauer Rose LLP

(57) ABSTRACT

Methods and apparatuses are described for real-time monitoring of computer system processor and transaction performance during an ongoing performance test. A plurality of monitoring agent processes executing on a processor of a first computing device in a computer system testing environment extracts performance data relating to the ongoing performance test in the computer system testing environment by scraping CPU usage data, analyzing submitted transaction data as stored in a transaction log file and executing search queries against a transaction database in the computing system testing environment to generate a transaction lifecycle dataset. A second computing device retrieves files stored at a predetermined location and generates one or more graphical representations of the performance data contained in the files for display, the graphical representations including at least one interactive chart to indicate a relationship between the CPU usage data, the submitted transaction data, and the transaction lifecycle dataset.

17 Claims, 8 Drawing Sheets

REAL-TIME MONITORING OF COMPUTER SYSTEM PROCESSOR AND TRANSACTION PERFORMANCE DURING AN ONGOING PERFORMANCE TEST

TECHNICAL FIELD

This application relates generally to methods and apparatuses, including computer program products, for real-time monitoring of computer system processor and transaction performance during an ongoing performance test.

BACKGROUND

For large-scale computing systems such as mainframes and/or distributed systems that process huge numbers of transactions, performing testing and quality assurance of software application code changes before implementing the code changes in production was a daunting task. A typical new release of such application code can contain hundreds of changes that require intensive and time-consuming testing procedures before being rolled out to production.

Often, a performance test of such code changes would take several weeks and could not adequately be monitored while the test was being executed to determine errors or other problems with processor performance and/or transaction performance that result from the code changes. Instead, it would take weeks for a quality assurance team to assess the performance test data after the fact and then provide its feedback, which would slow down the development, testing, and production rollout of software code to these large-scale systems.

SUMMARY

Therefore, methods and systems are needed to monitor computer system processor and transaction performance in a testing environment in real-time during an ongoing performance test and generate interactive graphical user interface representations of the performance data, to enable developers, testers, and leadership team directors, and senior management to understand and rectify potential issues with software code changes in a much more timely fashion.

There are several advantages provided by the systems and methods described herein. First, the performance data from the ongoing performance test is collected in real-time and distributed to a web server application that can render dynamic and interactive graphical representations of the performance data very soon after the data is collected. This allows developers to quickly understand the performance impact of the code under test and to see where computational and/or transaction problems or inefficiencies are arising almost immediately, instead of waiting for several weeks for performance test results to be collected and integrated into a graphical format for display and analysis.

Second, the methods and systems described herein impose minimal processing impact on the testing environment. Instead of requiring a significant monitoring tool that is executing on the computing systems in the testing environment (and consuming CPU/memory/hardware resources that may affect the testing procedure), the systems and methods described herein take up a very small footprint on the computing device(s) in the testing environment, such that almost no computing resources within the testing environment beyond those already allocated to performing the test are required to collect the performance data and provide the data to the web server application.

The invention, in one aspect, features a method for real-time monitoring of computer system processor and transaction performance during an ongoing performance test. A plurality of monitoring agent processes executing on a processor of a first computing device in a computer system testing environment extracts performance data relating to the ongoing performance test in the computer system testing environment. A first monitoring agent process scrapes CPU usage data from an on-screen performance view of the plurality of test systems engaged in the ongoing performance test for storage in a first file at a predetermined location on the computing device. A second monitoring agent process analyzes submitted transaction data as stored in a transaction log file in the computer system testing environment and selects a subset of the submitted transaction data for storage in a second file at the predetermined location, where selection of the subset is based upon one or more transaction types. A third monitoring agent process executes search queries against a transaction database in the computing system testing environment to generate a transaction lifecycle dataset for each transaction that identifies at least a starting time and an ending time of one or more events that comprise the transaction and stores the transaction lifecycle dataset in a third file at the predetermined location. A second computing device outside of the computer system testing environment retrieves the files stored at the predetermined location in the computer system testing environment and generates one or more graphical representations of the performance data contained in the files for display, the graphical representations including at least one interactive chart to indicate a relationship between the CPU usage data, the subset of submitted transaction data, and the transaction lifecycle dataset.

The invention, in another aspect, features a system for real-time monitoring of computer system processor and transaction performance during an ongoing performance test. The system comprises a plurality of monitoring agent processes executing on a processor of a first computing device in a computer system testing environment and a second computing device outside of the computer system testing environment. The plurality of monitoring agent processes extracts performance data relating to the ongoing performance test in the computer system testing environment. A first monitoring agent process scrapes CPU usage data from an on-screen performance view of the plurality of test systems engaged in the ongoing performance test for storage in a first file at a predetermined location on the computing device. A second monitoring agent process analyzes submitted transaction data as stored in a transaction log file in the computer system testing environment and selects a subset of the submitted transaction data for storage in a second file at the predetermined location, where selection of the subset is based upon one or more transaction types. A third monitoring agent process executes search queries against a transaction database in the computing system testing environment to generate a transaction lifecycle dataset for each transaction that identifies at least a starting time and an ending time of one or more events that comprise the transaction and stores the transaction lifecycle dataset in a third file at the predetermined location. The second computing device retrieves the files stored at the predetermined location in the computer system testing environment and generates one or more graphical representations of the performance data contained in the files for display, the graphical representations including at least one interactive chart to indicate a relationship between the CPU usage data, the subset of submitted transaction data, and the transaction lifecycle dataset.

The invention, in another aspect, features a computer program product tangibly embodied in a non-transitory computer readable storage device, for real-time monitoring of computer system processor and transaction performance during an ongoing performance test. The computer program product includes instructions operable to cause a plurality of monitoring agent processes executing on a processor of a first computing device in a computer system testing environment to extract performance data relating to the ongoing performance test in the computer system testing environment. A first monitoring agent process scrapes CPU usage data from an on-screen performance view of the plurality of test systems engaged in the ongoing performance test for storage in a first file at a predetermined location on the computing device. A second monitoring agent process analyzes submitted transaction data as stored in a transaction log file in the computer system testing environment and selects a subset of the submitted transaction data for storage in a second file at the predetermined location, where selection of the subset is based upon one or more transaction types. A third monitoring agent process executes search queries against a transaction database in the computing system testing environment to generate a transaction lifecycle dataset for each transaction that identifies at least a starting time and an ending time of one or more events that comprise the transaction and stores the transaction lifecycle dataset in a third file at the predetermined location. The computer program product includes instructions operable to cause a second computing device outside of the computer system testing environment to retrieve the files stored at the predetermined location in the computer system testing environment and generate one or more graphical representations of the performance data contained in the files for display, the graphical representations including at least one interactive chart to indicate a relationship between the CPU usage data, the subset of submitted transaction data, and the transaction lifecycle dataset.

Any of the above aspects can include one or more of the following features. In some embodiments, the plurality of monitoring agent processes imposes minimal additional processing resources on the processor of the first computing device. In some embodiments, the step of scraping CPU usage data comprises capturing an image of the on-screen performance view that includes the CPU usage data for a plurality of processors of computing systems in the computer system testing environment, determining an on-screen position of the CPU usage data as represented in the image, and extracting the CPU usage data from the captured image by recognizing characters positioned at the on-screen position and storing the recognized characters in the first file.

In some embodiments, the on-screen performance view is generated by a third computing device in the computer system testing environment and the step of scraping CPU usage data comprises establishing a connection to the third computing device by emulating authentication input to the third computing device, issuing a print screen command to the third computing device to capture text from the on-screen performance view, and parsing the captured text to determine the CPU usage data and storing the parsed CPU usage data in the first file.

In some embodiments, the step of analyzing submitted transaction data as stored in a transaction log file comprises scanning rows of data stored in the transaction log file to identify rows that match the one or more transaction types, where the identified rows are the subset of the submitted transaction data, extracting data elements from the transaction log file for each of the rows in the subset, and storing the extracted data elements in a character delimited format in the second file. In some embodiments, the interactive chart comprises a line graph for each of the CPU usage data, the subset of submitted transaction data, and the transaction lifecycle dataset. In some embodiments, the plurality of monitoring agent processes completes the steps in under five CPU cycles of the processor of the first computing device.

In some embodiments, the step of retrieving the files stored at the predetermined location comprises establishing a file transfer session with the first computing device, pulling the first file, the second file, and the third file from the predetermined location, and closing the file transfer session. In some embodiments, step of retrieving the files imposes minimal additional processing resources on the processor of the first computing device.

In some embodiments, the steps of extracting the performance data and retrieving the files are performed at predetermined regular intervals and the graphical representations are updated in real-time as soon as the steps of extracting the performance data and retrieving the files are performed. In some embodiments, the ongoing performance test is a stress test operable to initiate a number of transactions that is multiple times greater than an expected number of transactions. In some embodiments, the plurality of monitoring agent processes comprise cyclic mainframe jobs that define units of work to be performed by the processor of the first computing device against one or more computing devices in the computing system testing environment.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
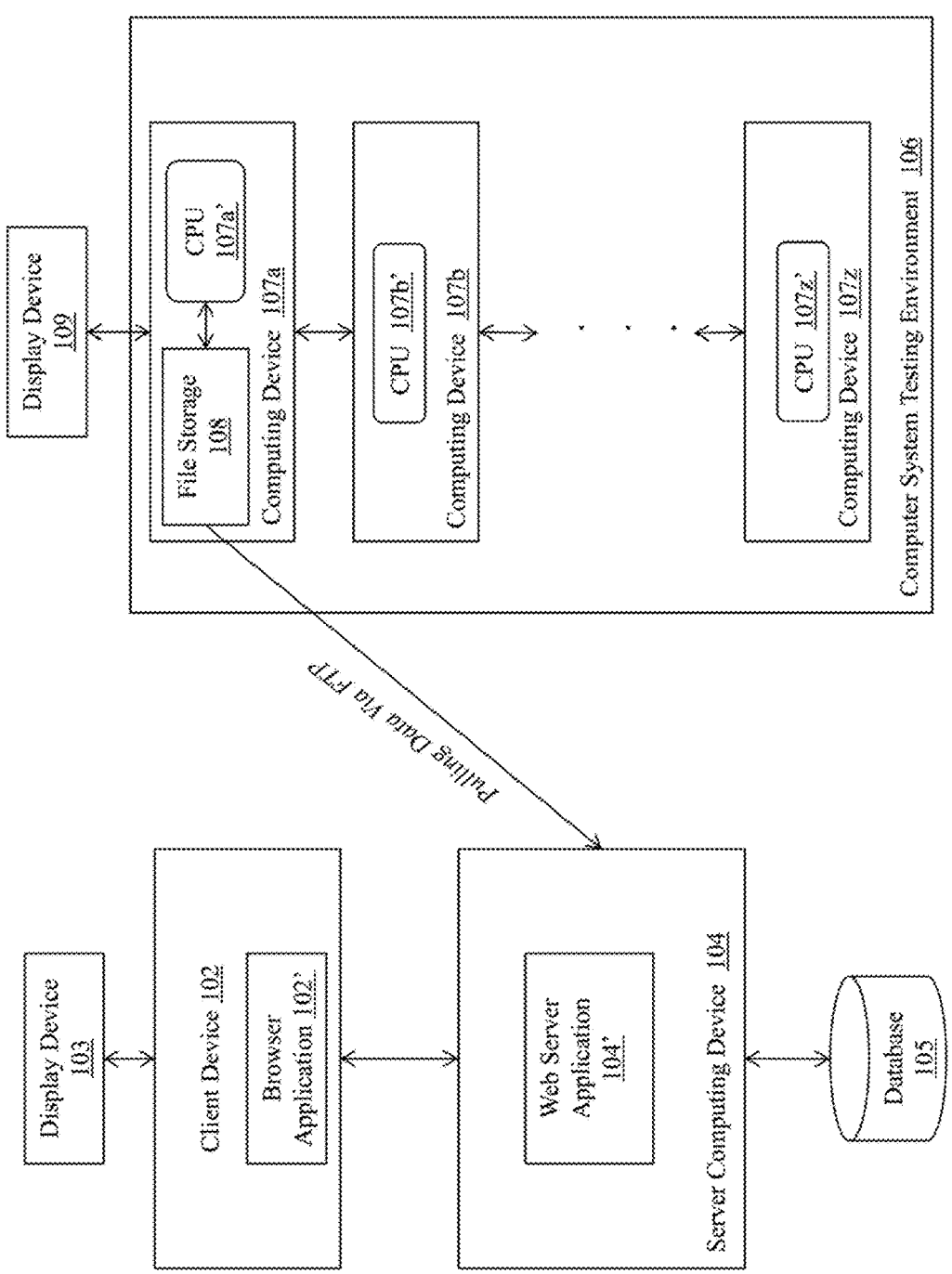
FIG. 1 is a block diagram of a system for real-time monitoring of computer system processor and transaction performance during an ongoing performance test.

FIG. 1 is a block diagram of a system 100 for real-time monitoring of computer system processor and transaction performance during an ongoing performance test. The system 100 includes a client device 102 executing a web browser application 102' and being coupled to a display device 103, a server computing device 104 executing a web server application 104' and coupled to a database 105, a computer system testing environment 106 comprising a plurality of computing devices 107a-107z each including a CPU 107a'-107z'. At least one of the computing devices 107a includes a file storage area 108 and is coupled to a display device 109.

The components of the system 100 can be connected to each other via a communications network (not shown) that enables the components to communicate with each other in order to perform the process of monitoring of computer system processor and transaction performance during an ongoing performance test as described herein. The network may be a local network, such as a LAN, or a wide area network, such as the Internet and/or a cellular network. In some embodiments, the network is comprised of several discrete networks and/or sub-networks (e.g., cellular to Internet) that enable the components of the system 100 to communicate with each other.

The client device 102 is a computing device having a processor and a memory that is capable of connecting to the server computing device 104 (e.g., via a communications network) in order to transmit data to the server computing device and receive data from the server computing device. The client device 102 includes client web browser software installed locally (e.g., Microsoft Internet Explorer®, Mozilla Firefox®, Google Chrome®) which is capable of establishing a session with the web server application 104' running on the server computing device 104. Example client devices 102 can include, but are not limited to a smart phone (e.g., Apple iPhone®), tablet, or other mobile communications device, a personal computer, or the like. The mobile device 102 includes network-interface components to enable the user to connect to a communications network, such as the Internet, wireless network (e.g., GPRS, CDMA, RF), or the like.

The client device 102 is coupled to a display device 103 (e.g., a monitor via HDMI port) that enables the display of graphical user interface data to a user of the client device 102. For example, the display device 103 can display a user interface associated with the browser application 102' that allows the user to view screens and other data associated with the web server application 104' and also to provide input for, e.g., navigation and interactivity with the web server application 104' (e.g., via input devices coupled to the client device 102).

The server computing device 104 is a computing device having a processor and a memory that communicates with the client device 102 (e.g., via a session between the web server application 104' and the browser application 102') and also communicates with the computer system testing environment 106 as will be explained in greater detail below. The server computing device 104 includes a web server application 104' that enables the delivery of interactive graphical elements to the client device, such as charts, graphs, and other types of data elements. For example, the web server application 104' can be an HTML/javascript-based web application that delivers software program elements and graphical representations to the client device 102. In one embodiment, the web server application 104' is implemented in Tomcat 6.0 server software with a Java® Development Kit version 1.6 environment using elements such as Spring MVC, Spring Security, Slf4j, Ehcache, Commons Net, and Spring Data JPA. The web server application 104' can also, in some embodiments, provide applets and other elements (e.g., EasyUI, Highcharts, jQuery) to the browser application 102' on the client device 102 for display of and interactivity with the delivered data on the display device 103.

The server computing device 104 is coupled to a database 105 that provides resources for the web server application 104' to perform the processes described herein. In one embodiment, the database 105 is a MySQL 5.1 database that communicates with the Spring Data JPA element in the server computing device 104 in order to store and retrieve data for use with the web server application 104'.

As mentioned above, the server computing device 104 is also connected to the computer system testing environment 106. The computer system testing environment 106 is comprised of a plurality of computing systems 107a-107z that collectively execute software under test to perform various types of computer transactions. In some embodiments, the computer system testing environment 106 is configured to replicate a production environment and may execute software code that is a newer version than the code that is implemented in the production environment (e.g., to test code changes, determine errors or deficiencies in the newer version of code, and so forth). In one example, the computer system testing environment 106 is a collection of mainframe computers using the z/OS® operating system available from IBM, and that are configured to execute large numbers of critical computing transactions quickly and efficiently, and to maintain high availability. The computer system testing environment 106 can be configured to conduct a stress test of the computing devices 107a-107z and software implemented therein, where the number of transactions executed by the environment is much larger than what would be expected in a normal production computing environment.

Each of the computing devices 107a-107z in the computer system testing environment 106 includes a central processing unit (CPU) 107a'-107z' that is responsible for executing the software applications implemented on the respective systems 107a-107z and carrying out the corresponding instructions. The performance of CPUs 107a'-107z' can be monitored to determine, e.g., the amount of processing load that certain processes, jobs, or other software application tasks are imposing on the CPU. For example, one of the computer devices 107a can include a monitoring tool that is responsible for performance management and real-time monitoring of the computer systems 107a-107z (and associated CPUs 107a'-107z') in the computer system testing environment 106. An exemplary monitoring tool is CA SYSVIEW, available from IBM.

Also, at least one of the computing devices 107a in the computer system testing environment 106 includes a file storage area 108 for storage of data files, as will be described in greater detail herein. In some embodiments, the file storage area 108 is a directory or other location on a disk drive to which data files (e.g., text files, comma-separated value (CSV) files, image files, XML files) can be written. In an exemplary embodiment, the computing device 107a is configured to include a file transfer application (e.g., an FTP client) that makes the file storage area 108 available to other computing devices (e.g., server computing device 104) to pull data from the area 108.

The computing device 107a is capable of running monitoring agent processes that execute on the CPU 107a' to extract performance data relating to an ongoing performance test on the plurality of computer devices 107a within the computer system testing environment 106. In some embodiments, each monitoring agent process is an instance of a specific monitoring software program that is executed on the CPU 107a' and, in some cases, each monitoring agent process is made up of multiple threads that can execute concurrent instructions against any of the computing devices 107a-107z that make up the computer system testing environment 106. In some embodiments, the monitoring agent processes are capable of communicating with each other to share inputs/outputs and other data for performing the methods described herein. Exemplary monitoring agent processes include, but are not limited to, cyclic mainframe jobs that define units of work to be performed by the CPU 107a' of the computing device 107a against one or more of the computing device 107a-107z in the testing environment 106.

Figure 3:
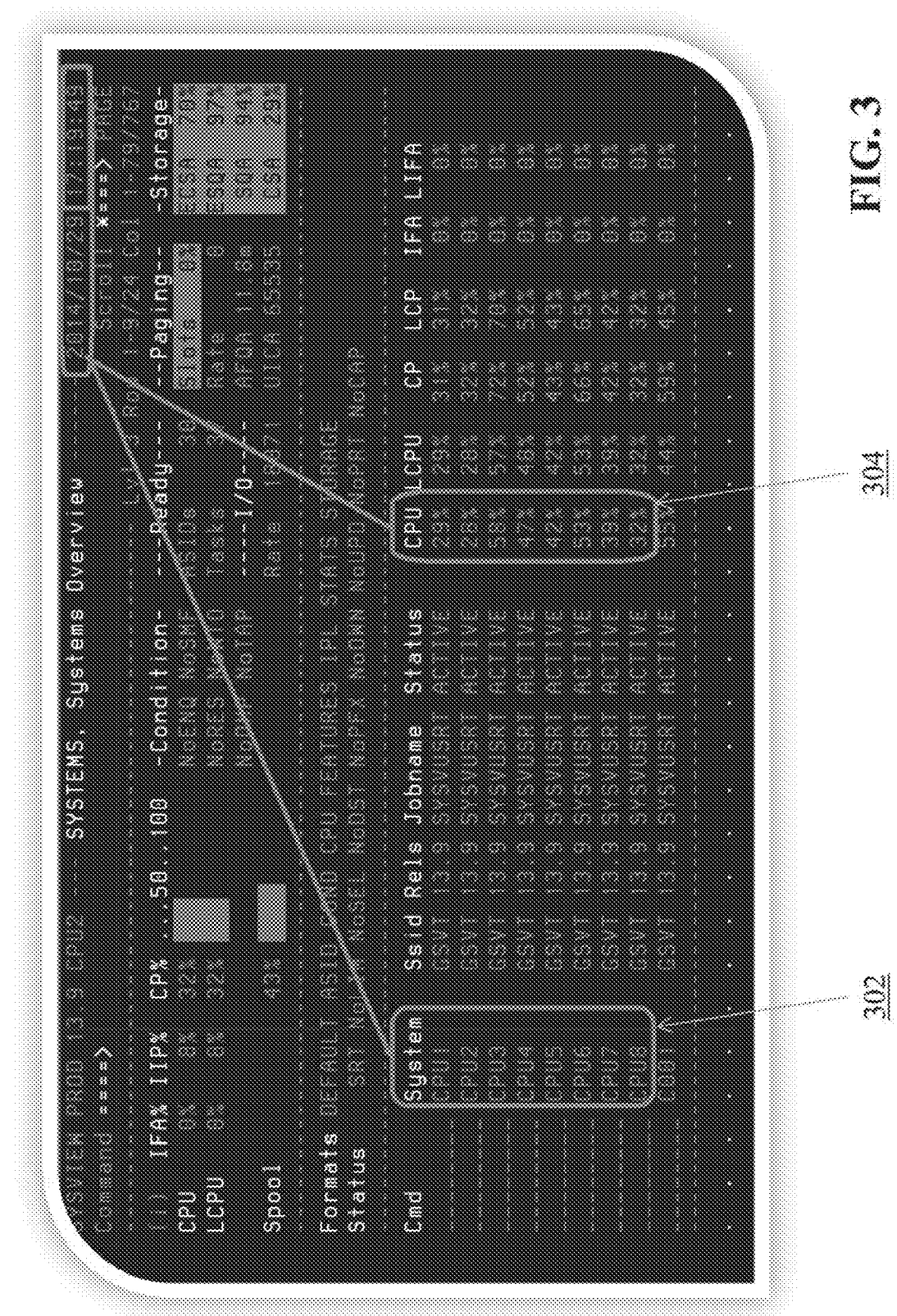
FIG. 3 is a diagram of an exemplary on-screen performance view of a plurality of test systems engaged in the ongoing performance test.

The computing device 107a can also be coupled to a display device 109, such as a monitor or other terminal, for display of performance data relating to the testing environment 106. For example, the display device 109 can show an on-screen performance view of the plurality of computing systems 107a-107z in the environment 106 as provided by the monitoring tool mentioned above. An example on-screen performance view is shown in FIG. 3 and will be explained in greater detail below.

Figure 2:
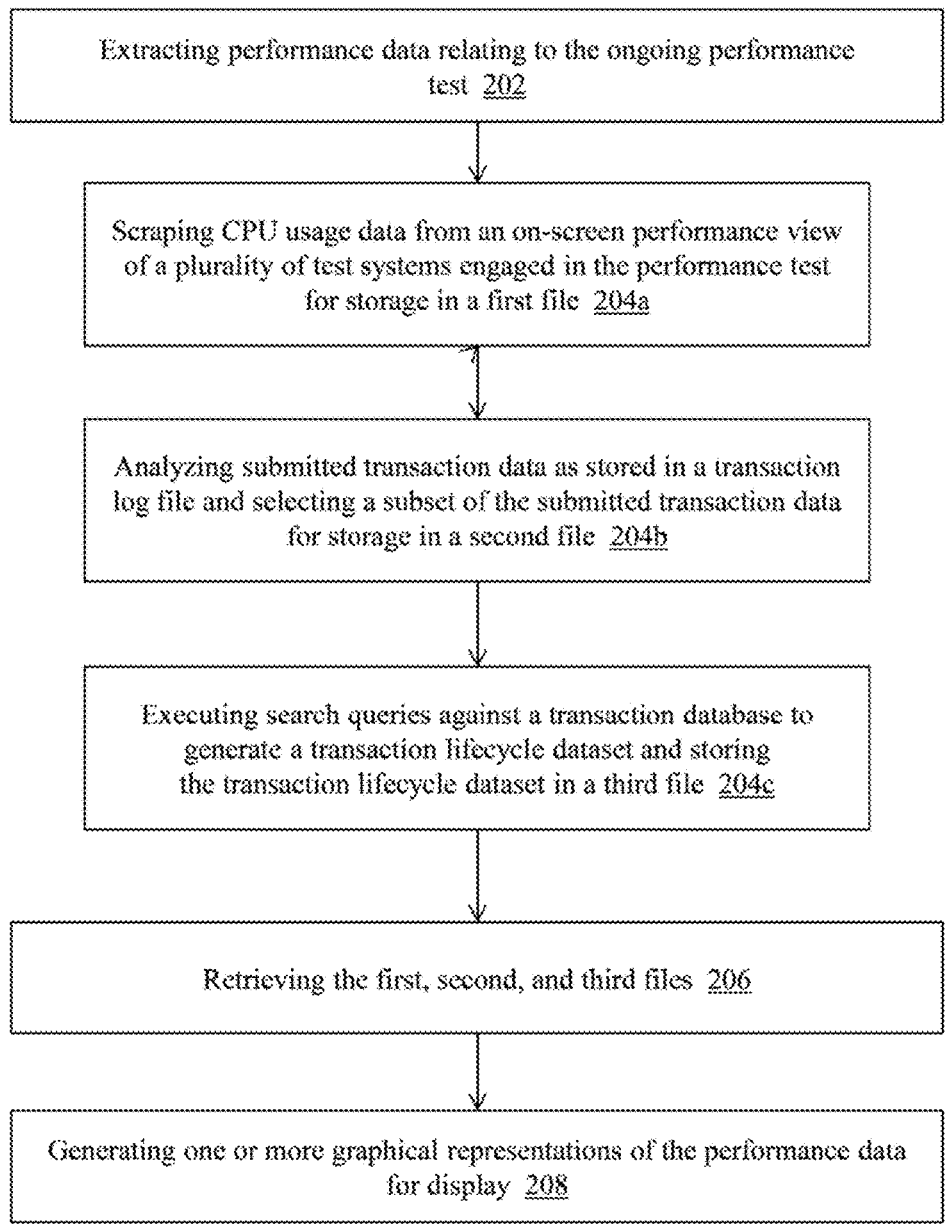
FIG. 2 is a flow diagram of a method for real-time monitoring of computer system processor and transaction performance during an ongoing performance test.

FIG. 2 is a flow diagram of a method 200 for real-time monitoring of computer system processor and transaction performance during an ongoing performance test, using the system 100 of FIG. 1. The plurality of monitoring agent processes described above, that are executing on the CPU 107a' of the computing device 107a in the computer system testing environment 106 extract (202) performance data relating to the ongoing performance test in the computer system testing environment 106.

A first monitoring agent process scrapes (204a) CPU usage data from an on-screen performance view that contains such data for the plurality of computing devices 107a-107z within the testing environment that are engaged in the ongoing performance test. For example, the on-screen performance view (as shown in FIG. 3) can include, among other things, a processor execution percentage 304 for each CPU 107a-107z (identified by CPU IDs 302) engaged in the test. In one embodiment, the processor execution percentage for a CPU represents an amount of processing resources currently being utilized by a process or job (or multiple processes/jobs) executing on the CPU. The first monitoring agent process is responsible for collecting the CPU usage data and storing the CPU usage data in a file (e.g., in file storage area 108).

To that end, the first monitoring agent process can utilize a number of different technical methods to scrape the CPU usage data from the on-screen performance view. In one embodiment, the first monitoring agent process captures an image of the on-screen performance view that includes the CPU usage data. For example, the first monitoring agent process can collect a screenshot of the on-screen performance view as displayed on display device 109 and store the screenshot as an image file (e.g., .jpg file) in the file storage area 108. The first monitoring agent process can then determine an on-screen position of the CPU usage data as represented in the image file. For example, the first monitoring agent process can scan the image file to determine coordinates (e.g., x value, y value) of the position of the CPU usage data, or in some cases, the first monitoring agent process can be preconfigured with the default coordinates for the position. The first monitoring agent process can then extract the CPU usage data from the captured image file (e.g., using optical character recognition (OCR) techniques) by recognizing characters positioned at the determined on-screen position and then store the recognized characters in a first file (e.g., a CSV file) in the file storage area 108.

For example, the first monitoring agent process can store the CPU usage data represented in FIG. 3 in a first file using the following format:

[timestamp],[CPUID],[CPU_Percentage]

Accordingly, the data shown in FIG. 3 would be stored in the first file as:

2014/10/29/17:19:49,CPU1,29
2014/10/29/17:19:49,CPU2,28
2014/10/29/17:19:49,CPU3,58
2014/10/29/17:19:49,CPU4,47
2014/10/29/17:19:49,CPU5,42
2014/10/29/17:19:49,CPU6,53
2014/10/29/17:19:49,CPU7,39
2014/10/29/17:19:49,CPU8,32

In another method, the on-screen performance view may be provided by a different computing device (e.g., 107b) in the computer system testing environment than the computing device 107a. In such a case, the first monitoring agent process can establish a connection to the different computing device 107b by emulating authentication input to the different computing device 107b. For example, the first monitoring agent process can establish a connection to the different computing device 107b and automatically submit authentication credentials (e.g., username, password) by sending emulated keyboard input that enables the first monitoring agent process to interface with the different computing device 107b. Once authenticated, the first monitoring agent process can issue a print screen command (e.g., PrintScreen, PrintText) with appropriate operators, that captures the text contained within the on-screen performance view and further parses the captured text (e.g., by scanning the text to look for the position specific characters such as '%') to determine a location of the CPU usage data. The first monitoring agent process can then format the parsed CPU usage data and store the data in a first file (e.g., a CSV file) in the file storage area 108, as explained previously.

Turning back to FIG. 2, a second monitoring agent process analyzes (204b) submitted transaction data as stored in a transaction log file associated with the performance test, and selects a subset of the submitted transaction data for storage in a second file in the file storage area 108. For example, the performance test may generate a large number of individual transactions that relate to a particular computing application, and the monitoring tool of computing device 107a (or specific tool(s) of computing devices 107a-107z in the testing environment 106) may be capable of logging the transactions in a transaction log file (or several log files). The second monitoring agent process can access the log file(s) and determine a subset of transactions as stored in the log file(s) that are important or relevant to the performance test/computing application. For example, if the computing application is a large-scale networking application, the relevant transactions may be connections established, successful packets sent, packets timed out, error messages generated, and so forth. Each of these transactions can be assigned to a particular transaction type and/or identifier in the log file(s) and the second monitoring agent process can be programmed to select only certain transactions based upon the particular identifiers.

For example, a developer conducting the performance test may only be interested in the number of connections established (where an established connection transaction has the transaction type CNX) and the volume of packets transmitted (where a packet transmission transaction has the transaction type PX) during those connections because the test software implemented in the testing environment 106 contains new code that is specifically related to the connection functionality. Therefore, the second monitoring agent can be configured to select only the transactions in the log file(s) that relate to the CNX and PX transaction types by scanning rows of data stored in the transaction log file(s) to identify rows that match the transaction types and extract relevant data elements from the transaction log file for each of the pertinent rows. In some embodiments, the second monitoring agent process can select all data elements associated with a particular row or, in some embodiments, the second monitoring agent process can select only certain data elements associated with a particular row. The second monitoring agent process can format the extracted data elements and then store the data elements (e.g., in a character delimited format) in a second file in the file storage area 108.

In another example, the computing application can be a large-scale trading application and the relevant transactions may be buys, sells, and fills of orders. Each of these transactions can be assigned to a particular transaction type and/or identifier in the log file(s) and the second monitoring agent process can be programmed to select only certain transactions based upon the particular identifiers.

Next, a third monitoring agent process executing on the CPU 107a' of computing device 107a executes (204c) search queries against a transactional database that contains data associated with the ongoing performance test in the testing environment 106 to generate a transaction lifecycle dataset. For example, in the context of a trading application, the developer performing the test may be interested in 'life of trade' data, where a particular transaction (i.e., trade) has a start point (i.e., a request to trade ten shares of AAPL) and an end point (i.e., execution of the trade between two parties). The third monitoring agent process can execute complex database queries (e.g., DB2) to collect and correlate the individual transaction data points that are used to construct the transaction lifecycle (e.g., orders, executions, other interim transactions). The third monitoring agent process formats the data to generate the transaction lifecycle dataset and stores the transaction lifecycle dataset in a third file in the file storage area 108. In a preferred embodiment, the monitoring agent processes perform the above-described steps on a cyclical bases (i.e., periodically at regular intervals) and conclude their processing during each interval within three to four CPU cycles of the CPU 107a' on computing device 107a.

Once the first, second, and third monitoring agent processes have performed the above-described process steps, the server computing device 104 (which is outside the testing environment 106) retrieves (206) the first file, the second file, and the third file from the file storage area 108 for processing and transformation by the web server application 104' into interactive graphical representations (i.e., charts, graphs, tables) for display via the web browser application 102' and display device 103 of client device 102. In a preferred embodiment, the server computing device 104 pulls the first, second, and third files from the computing device 107a automatically without requiring any additional processing resources of the computing device 107a. The computing device 107a may have file transfer software libraries installed to make the file storage area 108 available to external computing devices like server computing device 104. In one example, the server computing device 104 can utilize a file transfer protocol (FTP) client to pull the files. The server computing device 104 establishes a file transfer session with the computing device 107a, pulls the first file, the second file, and the third file from the file storage area 108, and closes the file transfer session.

It should be appreciated that the monitoring agent processes can update and/or overwrite the files stored in the file storage area 108 as new performance test data is collected and/or pulled to the server computing device 104. In some embodiments, the server computing device 104 copies the files to a local storage area (not shown), leaving the files intact on the computing device 107a. In some embodiments, the server computing device copies the files and then deletes them from the file storage area 108.

After the first, second, and third files are pulled from the computing device 107a, the server computing device 104 (via the web server application 104') generates (208) one or more graphical representations of the performance data embodied in the first, second, and third files for display (e.g., via web browser application 102' and display device 103). The graphical representations are interactive and adjustable, enabling a user at client device 102 to explore and drill down on relevant data to understand how the testing environment 106 is performing at computational and transactional levels during the ongoing performance test. It should be appreciated that the data stored in the files as described above is formatted in a way to enable efficient and fast updating and regeneration of the graphical representations provided by the web server application 104'—such that the graphical representations can be updated to reflect the most recent performance data in real-time, as soon as the performance data has been collected by the first, second, and third monitoring agent processes.

Figure 4:
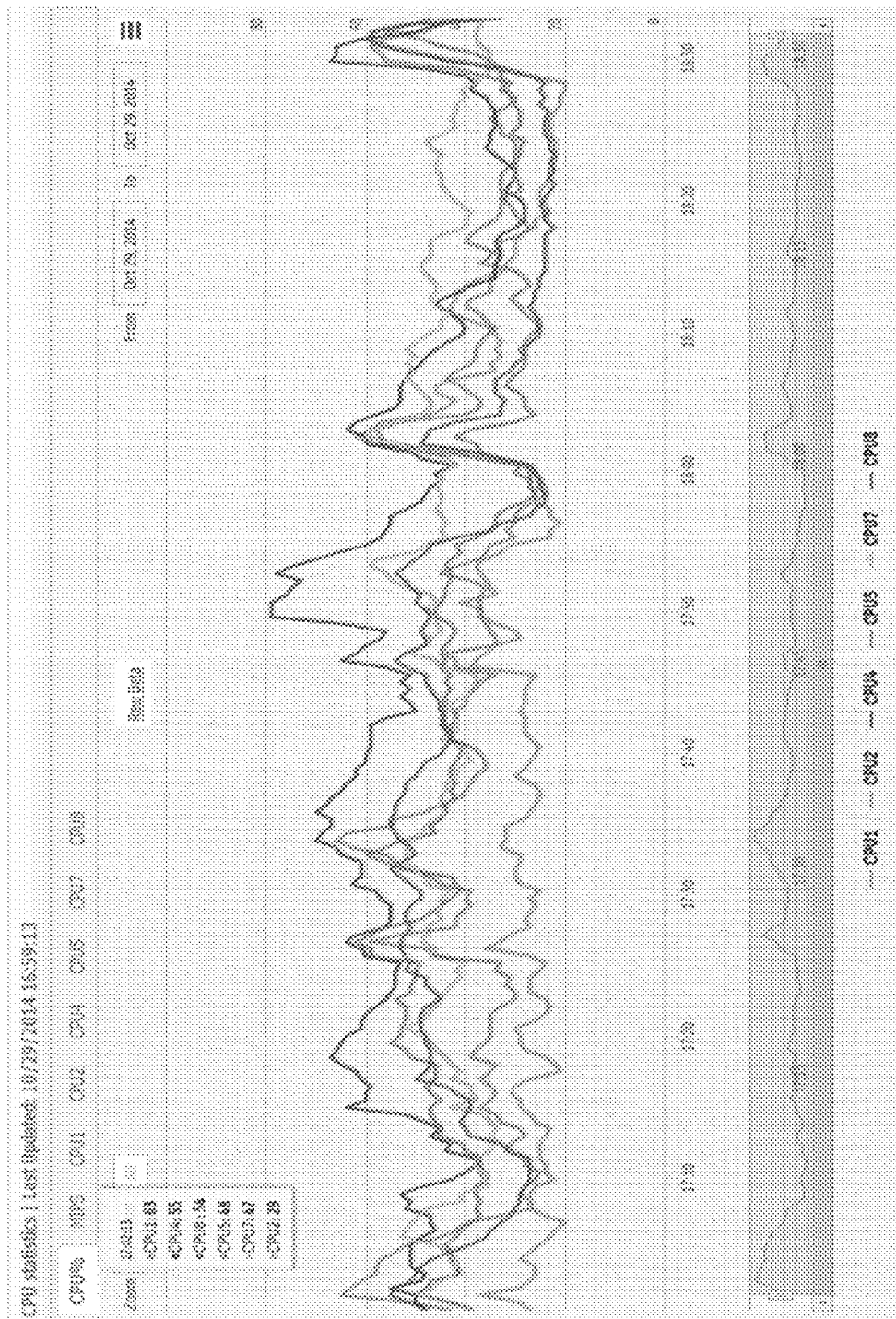
FIG. 4 is a diagram of an exemplary interactive chart displaying CPU usage data for a plurality of test systems engaged in the ongoing performance test.

FIG. 4 is a diagram of an exemplary interactive chart displaying CPU usage data for a plurality of test computer systems (e.g., computer devices 107a-107z) engaged in the ongoing performance test. As described previously, the first monitoring agent process scrapes the CPU usage data from an on-screen performance view and stores the CPU usage data in a first file in the file storage area 108, which is then pulled to the server computing device 104. The web server application 104' then generates an interactive chart (as shown in FIG. 4) that depicts the respective CPU usage data for the number of different CPUs (107a'-107z') engaged in the performance test. For example, the interactive chart can be a line graph that contains a line for each CPU showing the time at which the measurement was taken (along the x-axis) and the corresponding processor execution percentage at that time (along the y-axis). A user at client device 102 can use input devices coupled to the client device to select from a series of tabs at the top of the display to get data for a specific CPU, zoom in to a particular period of time, or change the number of days of data displayed in the chart.

Figure 5:
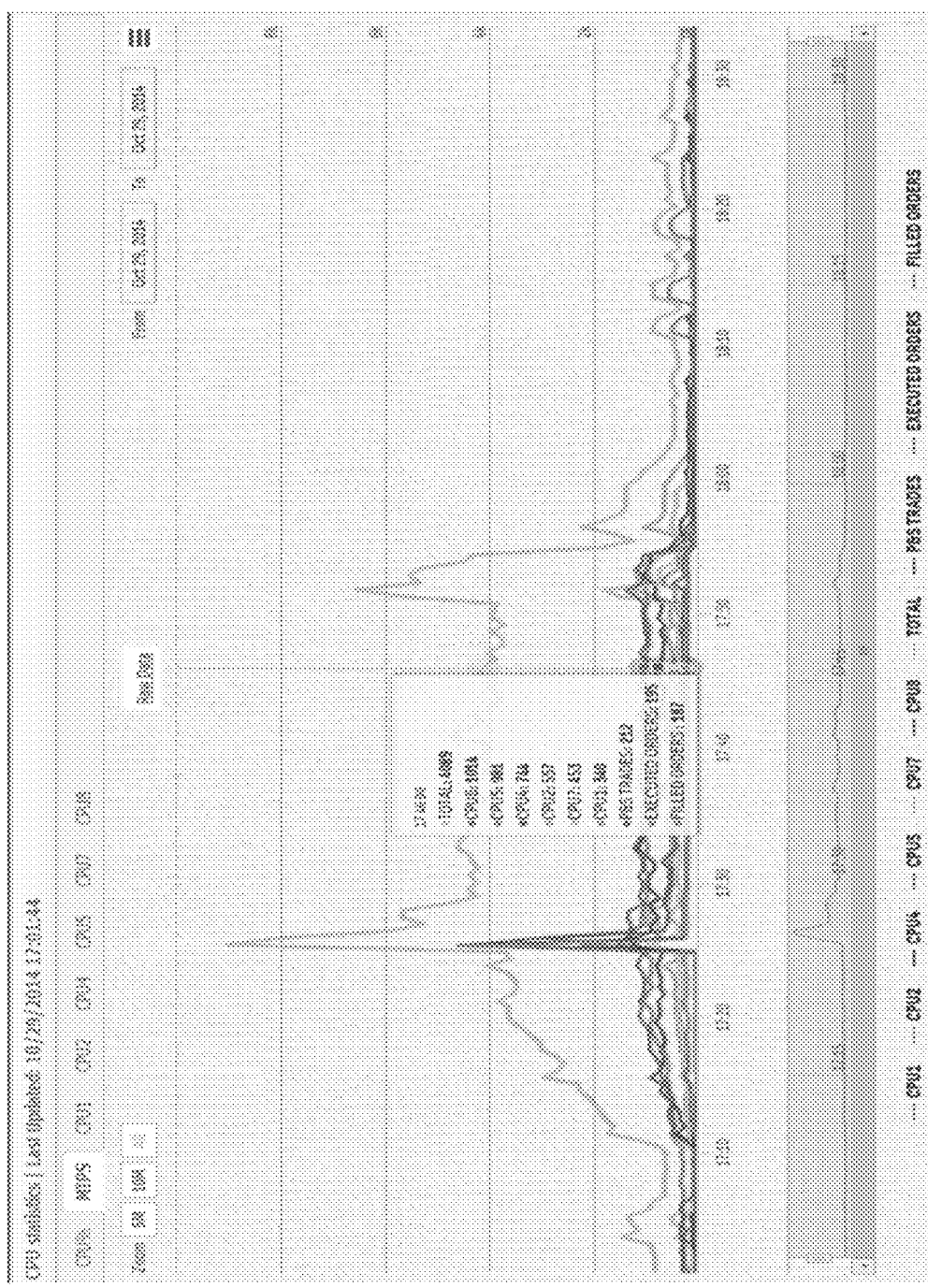
FIG. 5 is a diagram of an exemplary interactive chart displaying a relationship between CPU usage data and the subset of submitted transaction data.

FIG. 5 is a diagram of an exemplary interactive chart displaying a relationship between the CPU usage data and the subset of submitted transaction data, as provided in the first and second files. As shown in FIG. 5, the interactive chart includes a line graph containing a line representing the processor execution percentage for each of the CPUs 107a'-107z' (as in FIG. 4) as well as a line for a transaction volume of each of the transaction types (e.g., P&S Trades, Executed Orders, Filled Orders) taken from the data stored in the second file that was generated by the second monitoring agent process. The interactive chart of FIG. 5 depicts the time at which the relevant measurements were taken (along the x-axis) and the number of transactions (in thousands, along the y-axis). The interactive chart of FIG. 5 provides a correlation between the volume of each type of transaction and the execution percentage for each of the CPUs 107a'-107z' so that a developer can quickly see whether there are any anomalies with respect to the CPU execution percentage and the volume of transactions processed during the ongoing performance test. For example, if the CPU execution percentage for one or more CPUs is high yet the volume of transactions is low, it could indicate a problem with the processing efficiency for a particular transaction type or an issue with the CPU integrity for a particular computing device in the testing environment—thus requiring a review of the underlying code to see if there are errors or other problems that increase load on the CPUs and/or slow down the execution of a particular transaction. A user at client device 102 can use input devices coupled to the client device to zoom in to a particular period of time, change the number of days of data displayed in the chart, or filter out particular CPUs/transactions to get a more granular look at the data.

Figure 6:
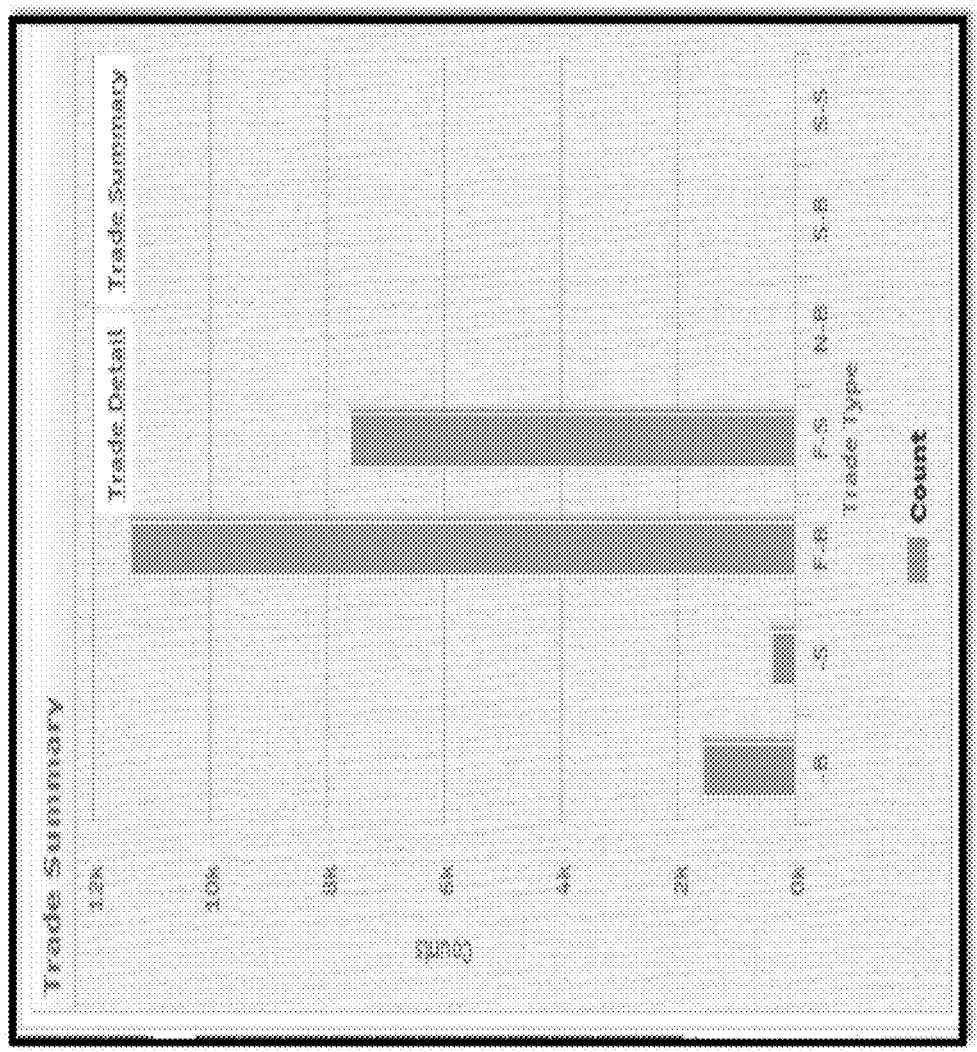
FIG. 6 is a diagram of an exemplary interactive chart displaying a volume of the subset of submitted transaction data.

FIG. 6 is a diagram of an exemplary interactive chart displaying a volume of the subset of submitted transaction data. As shown in FIG. 6, the interactive chart is a bar graph showing a count (or volume) for each type of transaction executed/processed during the performance test. For example, trade type-B had just under two-thousand transactions, while trade type F-B had just under twelve-thousand transactions. The interactive chart dynamically updates as updated files are pulled from the computing device 107a to the server computing device 104 and processed by the web server application 104'. A user at client device 102 can use input devices coupled to the client device to switch between a trade detail view and a trade summary view using the tabs at the top of the chart.

Figure 7:
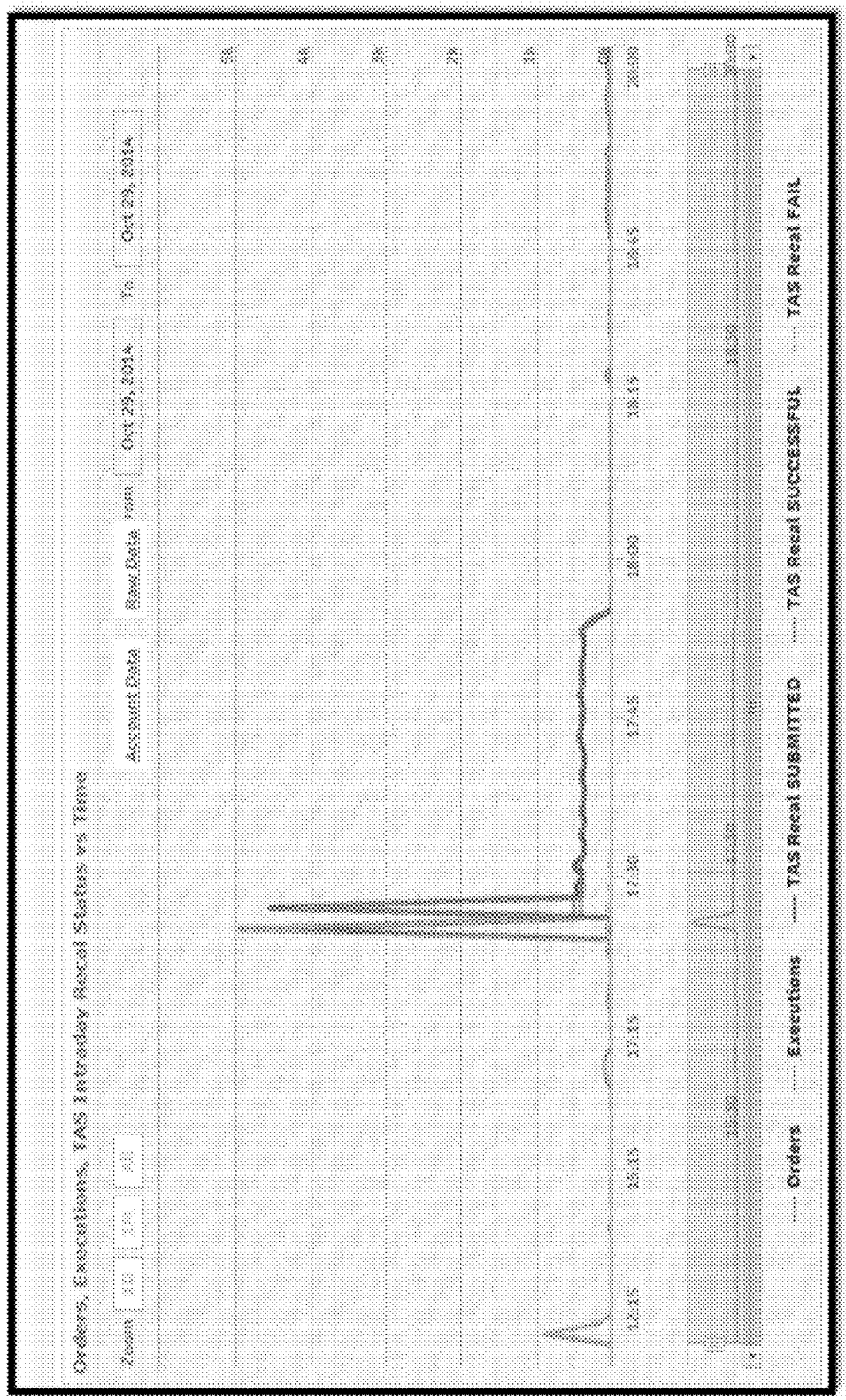
FIG. 7 is a diagram of an exemplary interactive chart displaying a timeline of the transaction lifecycle dataset.

FIG. 7 is a diagram of an exemplary interactive chart displaying a timeline of the transaction lifecycle dataset. As shown in FIG. 7, the interactive chart includes a line graph with lines corresponding to a volume of different transaction types (y-axis) processed over a certain period of time (x-axis). For example, the line graph shows that between 17:15 and 17:30, roughly five-thousand orders and executions occurred—because the number of orders and the number of executions are approximately equivalent, it indicates that the transactions are being processed properly. If, for example, the number of orders was much larger than the number of executions occurring around the same time, it could indicate an issue with the code being tested where executions were not completing successfully or in a timely manner. A user at client device 102 can use input devices coupled to the client device to zoom in to a particular period of time, change the number of days of data displayed in the chart, or switch between account data for a particular account and raw data of the overall transaction processing.

Figure 8:
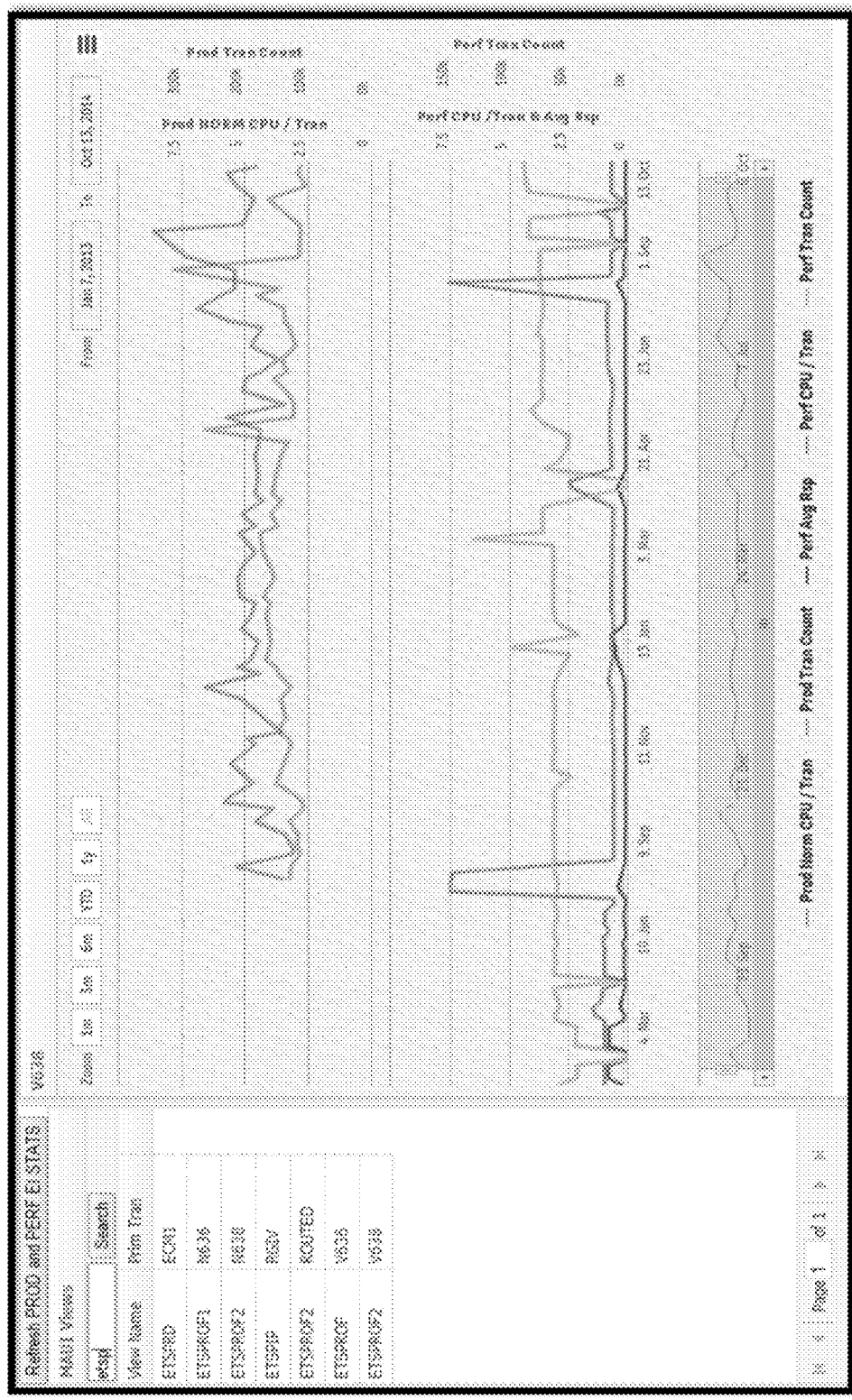
FIG. 8 is a diagram of an exemplary interactive chart displaying a relationship between the CPU usage data, the subset of submitted transaction data, and the transaction lifecycle dataset.

FIG. 8 is a diagram of an exemplary interactive chart displaying a relationship between the CPU usage data, the subset of submitted transaction data, and the transaction lifecycle dataset. As shown in FIG. 8, the interactive chart includes a line graph showing the performance of a given transaction in a production environment (the top line graph in FIG. 8) versus the performance of the same transaction in a testing environment (the bottom line graph in FIG. 8). The top line graph depicts a line indicating the transaction count (e.g., 0 k to 300 k) in relation to a line indicating the corresponding CPU cycles per transaction (e.g., 0 to 7.5) for a particular transaction executing in the production environment. The bottom line graph depicts a line indicating the transaction count (e.g., 0 k to 150 k) in relation to a line indicating the corresponding CPU cycles per transaction (e.g., 0 to 7.5) for the same transaction executing in the testing environment.

The line graphs in the interactive chart of FIG. 8 provides a real-time comparison of how a given transaction is working in a production environment versus a performance environment, and helps identifies any outliers between the two environments (e.g., transactions that may be incurring a greater number of transactions in production than in testing, or transactions that may have a larger impact on the CPU in testing than in production). For example, a spike in the performance line graph (bottom of FIG. 8) can indicate a potential issue in the production environment, so analysts or engineers can stop the environment from continuing until further analysis of the potential issue is performed. The line graphs in FIG. 8 also provide detailed information that indicates a processing cost to execute a particular transaction in each environment, as well as the corresponding volume. For example, if a new set of transactions is being progressively rolled out to a customer-facing production environment, the line graphs in FIG. 8 can show that, week-over-week, one transaction has a drop in transaction volume whereas a new transaction increases in volume.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above-described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985 G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computerized method for real-time monitoring of computer system processor and transaction performance during an ongoing performance test, the method comprising:

extracting, by a plurality of monitoring agent processes executing on a processor of a first computing device in a computer system testing environment, performance data relating to the ongoing performance test in the computer system testing environment comprising:

scraping, by a first monitoring agent process, CPU usage data from an on-screen performance view of a plurality of test systems engaged in the ongoing performance test for storage in a first file at a predetermined location on the computing device, the scraping comprising:

establishing a connection to a third computing device, automatically submitting authentication credentials to the third computing device using emulated keyboard input, issuing a print screen command to the third computing device that, when executed by the third computing device, generates a text file containing text displayed on a screen coupled to the third computing device, and scanning the text file for position-specific characters associated with the CPU usage data, extract the CPU usage data from the text file, and store the CPU usage data in the first file;

analyzing, by a second monitoring agent process, submitted transaction data as stored in a transaction log file in the computer system testing environment and selecting a subset of the submitted transaction data for storage in a second file at the predetermined location, wherein selection of the subset is based upon one or more transaction types; and executing, by a third monitoring agent process, search queries against a transaction database in the computing system testing environment to generate a transaction lifecycle dataset for each transaction that identifies at least a starting time and an ending time of one or more events that comprise the transaction and storing the transaction lifecycle dataset in a third file at the predetermined location;

retrieving, by a second computing device outside of the computer system testing environment, the files stored at the predetermined location in the computer system testing environment; and generating, by the second computing device, one or more graphical representations of the performance data contained in the files for display, the graphical representations including at least one interactive chart to indicate a relationship between the CPU usage data, the subset of submitted transaction data, and the transaction lifecycle dataset.

2. The method of claim 1, wherein the step of analyzing submitted transaction data as stored in a transaction log file comprises:

scanning, by the second monitoring agent process, rows of data stored in the transaction log file to identify rows that match the one or more transaction types, wherein the identified rows are the subset of the submitted transaction data;

extracting, by the second monitoring agent process, data elements from the transaction log file for each of the rows in the subset; and storing, by the second monitoring agent process, the extracted data elements in a character delimited format in the second file.

3. The method of claim 1, wherein the interactive chart comprises a line graph for each of the CPU usage data, the subset of submitted transaction data, and the transaction lifecycle dataset.

4. The method of claim 1, wherein the plurality of monitoring agent processes complete their processing in under five CPU cycles of the processor of the first computing device.

5. The method of claim 1, wherein the step of retrieving the files stored at the predetermined location comprises:

establishing, by the second computing device, a file transfer session with the first computing device;

pulling, by the second computing device, the first file, the second file, and the third file from the predetermined location; and closing, by the second computing device, the file transfer session.

6. The method of claim 1, further comprising performing the steps of extracting the performance data and retrieving the files at predetermined regular intervals and updating the graphical representations in real time as soon as the steps of extracting the performance data and retrieving the files are performed.

7. The method of claim 1, wherein the ongoing performance test is a stress test operable to initiate a number of transactions that is multiple times greater than an expected number of transactions.

8. The method of claim 1, wherein the plurality of monitoring agent processes comprise cyclic mainframe jobs that define units of work to be performed by the processor of the first computing device against one or more computing devices in the computing system testing environment.

9. A system for real-time monitoring of computer system processor and transaction performance during an ongoing performance test, the system comprising:

a plurality of monitoring agent processes executing on a processor of a first computing device in a computer system testing environment configured to extract performance data relating to the ongoing performance test in the computer system testing environment, wherein a first monitoring agent process is configured to scrape CPU usage data from an on-screen performance view of a plurality of test systems engaged in the ongoing performance test for storage in a first file at a predetermined location on the computing device, the scraping comprising:

establishing a connection to a third computing device, automatically submitting authentication credentials to the third computing device using emulated keyboard input, issuing a print screen command to the third computing device that, when executed by the third computing device, generates a text file containing text displayed on a screen coupled to the third computing device, and scanning the text file for position-specific characters associated with the CPU usage data, extract the CPU usage data from the text file, and store the CPU usage data in the first file, a second monitoring agent process is configured to analyze submitted transaction data as stored in a transaction log file in the computer system testing environment and selecting a subset of the submitted transaction data for storage in a second file at the predetermined location, wherein selection of the subset is based upon one or more transaction types, and a third monitoring agent process is configured to search queries against a transaction database in the computing system testing environment to generate a transaction lifecycle dataset for each transaction that identifies at least a starting time and an ending time of one or more events that comprise the transaction and storing the transaction lifecycle dataset in a third file at the predetermined location;

a second computing device outside of the computer system testing environment configured to retrieve the files stored at the predetermined location in the computer system testing environment and generate one or more graphical representations of the performance data contained in the files for display, the graphical representations including at least one interactive chart to indicate a relationship between the CPU usage data, the subset of submitted transaction data, and the transaction lifecycle dataset.

10. The system of claim 9, wherein the second monitoring agent process is configured to:

scan rows of data stored in the transaction log file to identify rows that match the one or more transaction types, wherein the identified rows are the subset of the submitted transaction data;

extract data elements from the transaction log file for each of the rows in the subset; and store the extracted data elements in a character delimited format in the second file.

11. The system of claim 9, wherein the interactive chart comprises a line graph for each of the CPU usage data, the subset of submitted transaction data, and the transaction lifecycle dataset.

12. The system of claim 9, wherein the plurality of monitoring agent processes complete their processing in under five CPU cycles of the processor of the first computing device.

13. The system of claim 9, wherein the second computing device is configured to:
establish a file transfer session with the first computing device;
pull the first file, the second file, and the third file from the predetermined location; and
close the file transfer session.

14. The system of claim 9, wherein the steps of extracting the performance data and retrieving the files are performed at predetermined regular intervals and the graphical representations are updated in real time based upon the most-recently extracted performance data as soon as the steps of extracting the performance data and retrieving the files are performed.

15. The system of claim 9, wherein the ongoing performance test is a stress test operable to initiate a number of transactions that is multiple times greater than an expected number of transactions.

16. The system of claim 9, wherein the plurality of monitoring agent processes comprise cyclic mainframe jobs that define units of work to be performed by the processor of the first computing device against one or more computing devices in the computing system testing environment.

17. A computer program product, tangibly embodied in a non-transitory computer readable storage device for real-time monitoring of computer system processor and transaction performance during an ongoing performance test, the computer program product including instructions operable to cause a plurality of monitoring agent processes executing on a processor of a first computing device in a computer system testing environment to extract performance data relating to the ongoing performance test in the computer system testing environment, wherein
a first monitoring agent process is configured to scrape CPU usage data from an on-screen performance view of a plurality of test systems engaged in the ongoing performance test for storage in a first file at a predetermined location on the computing device, the scraping comprising:
establishing a connection to a third computing device,
automatically submitting authentication credentials to the third computing device using emulated keyboard input,
issuing a print screen command to the third computing device that, when executed by the third computing device, generates a text file containing text displayed on a screen coupled to the third computing device, and
scanning the text file for position-specific characters associated with the CPU usage data, extract the CPU usage data from the text file, and store the CPU usage data in the first file,
a second monitoring agent process is configured to analyze submitted transaction data as stored in a transaction log file in the computer system testing environment and selecting a subset of the submitted transaction data for storage in a second file at the predetermined location, wherein selection of the subset is based upon one or more transaction types, and
a third monitoring agent process is configured to search queries against a transaction database in the computing system testing environment to generate a transaction lifecycle dataset for each transaction that identifies at least a starting time and an ending time of one or more events that comprise the transaction and storing the transaction lifecycle dataset in a third file at the predetermined location;
wherein the computer program product includes instructions operable to cause a second computing device outside of the computer system testing environment to retrieve the files stored at the predetermined location in the computer system testing environment and generate one or more graphical representations of the performance data contained in the files for display, the graphical representations including at least one interactive chart to indicate a relationship between the CPU usage data, the subset of submitted transaction data, and the transaction lifecycle dataset.

* * * * *